(12) United States Patent
Nikkinen

(10) Patent No.: US 9,400,058 B2
(45) Date of Patent: Jul. 26, 2016

(54) PINCH VALVE

(71) Applicant: Auto-Nikkinen, Lappeenranta (FI)

(72) Inventor: Antero Nikkinen, Lappeenranta (FI)

(73) Assignee: AUTO-NIKKINEN (FI)

( * ) Notice: Subject to any disclaimer, the term of this patent is extended or adjusted under 35 U.S.C. 154(b) by 62 days.

(21) Appl. No.: 14/353,178

(22) PCT Filed: Oct. 18, 2012

(86) PCT No.: PCT/FI2012/000042
§ 371 (c)(1),
(2) Date: Apr. 21, 2014

(87) PCT Pub. No.: WO2013/064719
PCT Pub. Date: May 10, 2013

(65) Prior Publication Data
US 2014/0339447 A1 Nov. 20, 2014

(30) Foreign Application Priority Data
Oct. 21, 2011 (FI) ........................................ 20110363

(51) Int. Cl.
*F16K 7/04* (2006.01)
*F16K 7/06* (2006.01)
*F16K 27/02* (2006.01)

(52) U.S. Cl.
CPC ... *F16K 7/04* (2013.01); *F16K 7/06* (2013.01); *F16K 27/0236* (2013.01)

(58) Field of Classification Search
CPC ............ F16K 7/04; F16K 7/0236; F16K 7/06
USPC .................................................... 251/4, 6, 7
See application file for complete search history.

(56) References Cited

U.S. PATENT DOCUMENTS

| | | | | |
|---|---|---|---|---|
| 2,710,998 A | * | 6/1955 | Meighan ................. | B60P 7/083 24/68 B |
| 3,029,846 A | * | 4/1962 | Summers .................. | H01J 9/38 137/327 |
| 3,759,483 A | | 9/1973 | Baxter | |
| 4,322,054 A | * | 3/1982 | Campbell ............... | F16K 7/061 251/5 |
| 4,372,528 A | * | 2/1983 | Raftis ....................... | F16K 7/04 251/127 |
| 4,436,277 A | | 3/1984 | Robak et al. | |

(Continued)

FOREIGN PATENT DOCUMENTS

JP 2004293769 10/2004

OTHER PUBLICATIONS

International Search Report for PCT/FI2012/000042 dated Feb. 26, 2013.

*Primary Examiner* — Marina Tietjen
*Assistant Examiner* — Umashankar Venkatesan
(74) *Attorney, Agent, or Firm* — Andrus Intellectual Property Law, LLP

(57) ABSTRACT

A part of an air tube having flexibility is surrounded by a casing, and the air tube inside the easing is pushed for deformation at a nearly right angle against the pipe axis by a male screw screwed to a female screw of the casing to change a cross sectional area of a passage inside the air tube. A first casing part and a second casing part are overlapped with each other, and openably connected by a hinge, and the overlap state of both the casing parts and is maintained by engaging a claw part with the hole. Opposite surfaces and of both the casing parts and are provided with support grooves and for supporting the outer peripheral surface of the air tube.

3 Claims, 1 Drawing Sheet

(56) References Cited

U.S. PATENT DOCUMENTS

| | | | | |
|---|---|---|---|---|
| 5,219,146 A * | 6/1993 | Thompson | F16K 7/061 | 251/7 |
| 5,657,960 A * | 8/1997 | Taylor | F16K 7/07 | 251/7 |
| 6,948,696 B1 * | 9/2005 | Aanonsen | F16K 7/061 | 251/4 |
| 7,159,838 B2 * | 1/2007 | Champagne | F16K 7/066 | 251/7 |
| 8,894,035 B2 * | 11/2014 | Ruelland | F16K 7/061 | 251/7 |
| 2012/0032098 A1 * | 2/2012 | Rozy | F16K 7/06 | 251/7 |

* cited by examiner

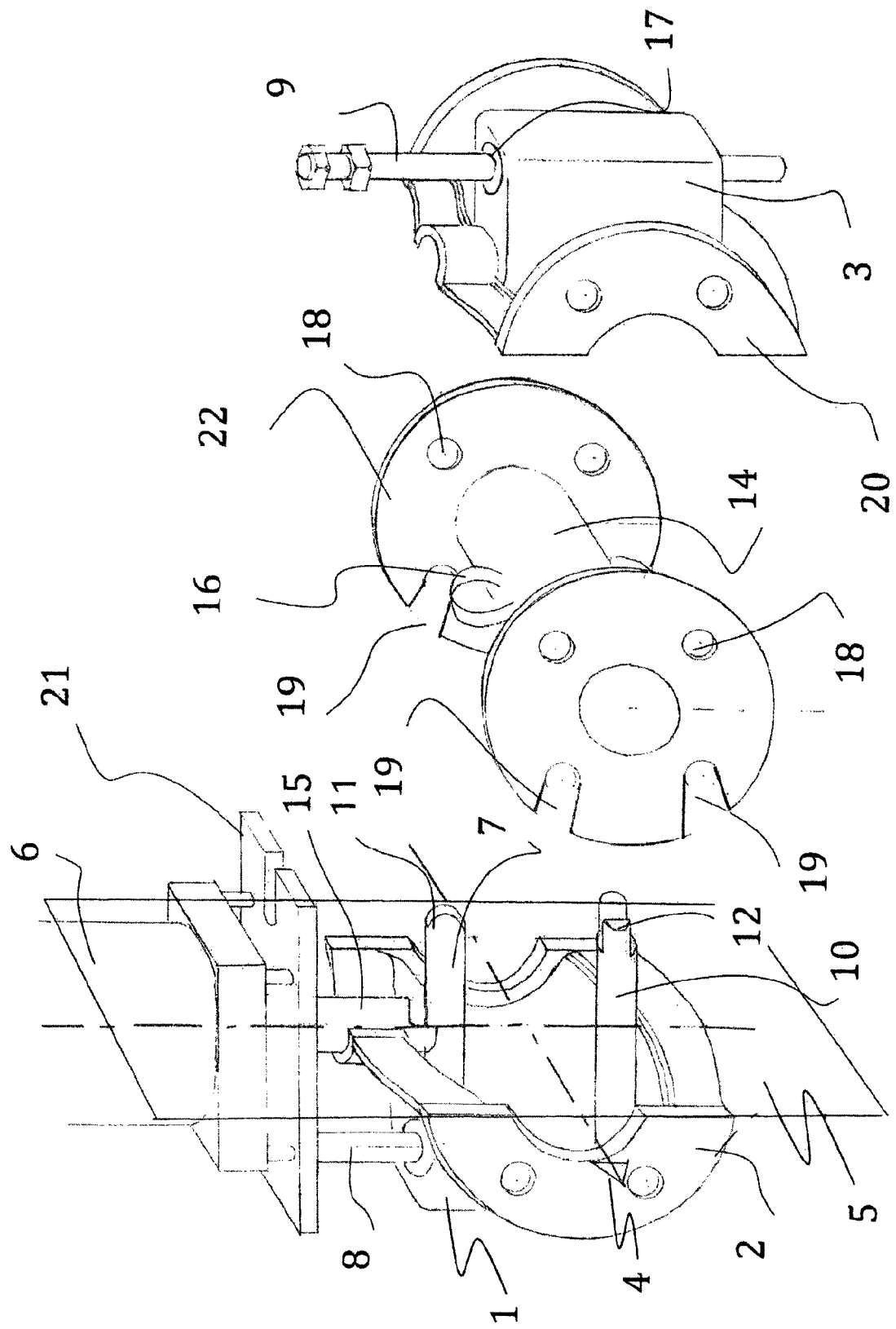

PINCH VALVE

CROSS REFERENCE TO RELATED APPLICATION

The present application is the U.S. national stage application of International Application PCT/FI2012/000042, filed Oct. 18, 2012, which international application was published on May 10, 2013, as International Publication WO2013/064719. The International Application claims priority of Finnish Patent Application 20110363, filed Oct. 21, 2011, the contents of which are incorporated herein by reference in their entireties.

The invention relates to a pinch valve, which comprises a valve body, a closure member placed inside the valve body, and a sleeve serving as the flow path, and which is intended in particular for the adjustment of the amount of flow of liquid substances as well as mixtures and compounds of liquid and solid substances. Various types of valves are typically used in conjunction with pipelines to adjust, close and open flow paths. It is known that a large number of different types of valve structures are used. One specific prior art valve structure is the pinch valve, which is used in applications where the flowing substance is very abrasive. In such applications, structures made of metal are not possible. The flowing substance causes wear and damage in typical valves, their bodies, closure members, and actuators.

The prior art solution in these applications is to use a valve which typically has a body made of metal, and a flow path sleeve manufactured from rubber by vulcanisation, installed inside the body. The sleeve also serves as the closure member of the valve when the sleeve is pinched by a force created by a mechanical actuator so that the internal surfaces of the sleeve meet and form a barrier which closes the flow path. A prior art solution is presented in publication JP2004293769 (A), where the valve casing can be opened in the direction of the flow path. The compression mechanism of the sleeve presented in the publication comprises a structure which compresses the sleeve from one side. Publication U.S. Pat. No. 3,759,483 (A) discloses a structure where there is a valve housing, which can be opened in the direction of the flow axis. In this publication, the member pinching the sleeve pinches the sleeve from one side.

The problem in the known solutions is the valve body structure, which is implemented so that it is difficult to perform maintenance of the valve. The most common maintenance of the valve comprises replacing the sleeve, and cleaning and repair of the mechanical parts of the actuator inside the body. In these known valve structures, the sleeve is placed on the actuator side of the valve body so that one half of the valve body is removed for maintenance, because the valve body is divided into two parts so that the interface is on the center axis of the flow path of the valve, perpendicularly to the movement of the compressing closure member. When the body halves are decoupled from each other, one compression rod of the compressing closure member is revealed, with the compression rod being attached to draw bars. The compression rod must first be removed from the fastening screws, after which the detaching of the sleeve from the compression rod can begin. The work is difficult to perform, because the flanges of the sleeve complicate the removing of the fastening parts. The structure is so troublesome that the valve must be removed completely from the pipeline so that the maintenance work can be carried out.

The purpose of the present invention is to provide a pinch valve, which avoids the above-mentioned disadvantages and therefore allows the valve to have a structure where the disassembly and assembly of the valve are simple and easy in conjunction with manufacture, installation and maintenance.

More specifically, the characteristics of the pinch valve according to the invention are presented in the characterizing part of claim 1.

The idea of the invention is to implement the structure of the valve so that the interface of the valve body is in the direction of the movement of the compressing closure member of the valve, is located on the center line of the flow path in the flow direction, and is in the direction of the work movement of the closure member. In other words, the idea that the valve body is opened in the flow direction at the center line of the sleeve on a plane which is in the direction of the movement of the actuator is a new and inventive solution. The structure according to the invention makes it possible to place the actuators in the valve so that the sleeve can be replaced by removing one of the valve body halves, whereby the sleeve can be removed from the compression rod of the closure member.

The invention will now be described in more detail by making reference to the accompanying FIG. 1, which shows the pinch valve according to the invention, with the valve opened and shown obliquely from above.

FIG. 1 shows the structure of the pinch valve according to the invention, with the valve structure comprising a valve body 1, which comprises the halves 2 and 3. The interface between the halves of the valve body 1 is located at the center axis of the flow line 4, at the point of level 5 which is in the direction of the work movement of the closure member. The actuator 6 is mounted on a mounting plate 21, to which one or two draw bars 8, 9 are connected. The member 15, for example a piston, which performs the work movement of the actuator, is attached to the compression rod 7. The draw bars, which are attached to the mounting plate 21, go through the bushings 17 in the valve body halves 2 and 3. The compression rod 7 is fastened to the draw bar 8 by means of a sliding connection. The compression rod 10 is fastened to the draw bar 8 so that the movement of the draw bar moves the compression rod against the sleeve 14, causing a pinching movement in the sleeve. In the valve body 1, which has two draw bars 8, 9, the compression rods are fastened between the draw bars so that guide slots 11 have been made at the ends of the compression rod 7, enabling the compression rod 7 to slide in a controlled manner between the draw bars 8 and 9. The compression rod 10 is attached to a fastening shoulder of the draw bars 8 and 9 by means of a fork slot 12, whereby the movement of the compression rod 10 with the draw bars 8 and 9 compresses and opens the sleeve 14. The sleeve 14 has pull loops 16, which are closed loops on the outer surface of the sleeve 14. The purpose of the pull loop is to open the compression of the sleeve 14 with the movement of the compression rods 7 and 10 in the event that the flowing substance sticks to the inner walls of the sleeve 14. The holes 18 in the flanges 22 of the sleeve 14 are made in such a way that the flange of the sleeve 14 has at least two slots 19 with an open edge so that the sleeve 14 can be installed into place onto the neck of the fastening screws by pushing from the side.

An example of how to replace the sleeve 14 in a valve according to the invention: The valve is fastened to the pipeline by means of flanges 20, which consist of two parts, and the split line is on the center axis 4 of the flow line of the valve in the direction of the work movement of the actuator 6. The valve halves are disconnected from each other by unscrewing the screws that connect the halves. The body half 3 can be removed by unscrewing the flange screws located on the side of the body half 3 and by removing the draw bar 9 from the mounting plate 21, and by loosening the screws on the side of the body half 2. Removing the body half 3 opens the valve structure so that the sleeve 14 can be pulled from inside the body half 2. When the valve is equipped with two draw bars, the draw bar 9 comes off the compression rods 7 and 10 with the body half 3.

The figures and the related description are only intended to illustrate the present invention. The details of the pinch valve may vary within the inventive idea presented in the claims. Furthermore, it is obvious to an expert that the structure can be implemented using a single draw bar, following essentially the same technical solutions as with two draw bars.

The invention claimed is:

1. A pinch valve, which comprises
    a pinch valve body comprising a first body half and a second body half and an interface there between,
    inside the body a sleeve made of rubber serving also as a closure member of the valve,
    an actuator to open and to close the valve,
    on the first side of the sleeve a transverse first compression rod,
    on the second side of the sleeve a transverse second compression rod,
    a mounting plate on which the actuator has been installed and comprising also draw bars and extending in the direction of the interface, said draw bars being supported in guide bushings in the body halves,
    a member performing the work movement of the actuator and being attached to the first compression rod,
    guide slots at the ends of the first compression rod enabling the compression rod to slide in a controlled manner between the draw bars,
    fork slots at the ends of the second compression rod and corresponding fastening shoulders in the draw bars so that the movement of the compression rod with the draw bars compresses and opens the sleeve,
    pull loops on the surface of the sleeve, through which the compression rods extend,
    so that the compression rods can at the same time on the opposite sides of the sleeve be pressed to close the sleeve and be separated to open the sleeve,
    said interface of the valve body being in the direction of the movement of the compression closure member of the valve, is located on the center line of the flow path in the flow direction, and is in the direction of the work movement of the closure member.

2. A pinch valve as claimed in claim 1, characterized in that the actuator of the pinch valve is fastened on the mounting plate and that the one or two draw bars are installed on the mounting plate, which draw bars are located in the body halves through guide bushings, and that the compression rod comprises guide slots for controlling the compression rod by means of the draw bars, and that the compression rod is connected to the draw bars by means of the fork slots.

3. A pinch valve as claimed in claim 1, characterized in that the sleeve of the pinch valve includes the pull loops in a closed position and that the holes on one side in the flanges of the sleeve are open-edge slots.

* * * * *